United States Patent
Nagasawa et al.

(10) Patent No.: US 11,658,502 B2
(45) Date of Patent: May 23, 2023

(54) POWER SUPPLY SYSTEM (71) Applicant: HONDA MOTOR CO., LTD., Tokyo (JP)

(72) Inventors: Minoru Nagasawa, Saitama (JP); Hirokazu Oguma, Saitama (JP); Arata Ohishi, Saitama (JP); Yasuo Yamada, Saitama (JP); Yoshihiro Kanamaru, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/678,017

(22) Filed: Feb. 23, 2022

(65) Prior Publication Data
US 2022/0302736 A1 Sep. 22, 2022

(30) Foreign Application Priority Data
Mar. 19, 2021 (JP) ............................ JP2021-046084

(51) Int. Cl.
| H02J 7/00 | (2006.01) |
| B60L 53/20 | (2019.01) |
| B60L 58/18 | (2019.01) |
| H02M 3/158 | (2006.01) |
| H02P 27/08 | (2006.01) |

(52) U.S. Cl.
CPC ........ H02J 7/007182 (2020.01); B60L 53/20 (2019.02); B60L 58/18 (2019.02); H02J 7/0013 (2013.01); H02J 7/0048 (2020.01); H02J 7/0063 (2013.01); *H02J 2207/20* (2020.01); *H02M 3/158* (2013.01); *H02P 27/08* (2013.01)

(58) Field of Classification Search
CPC .......... B60L 58/20; B60L 58/21; B60L 58/18; B60L 2240/547; B60L 50/40; B60L 58/14; B60L 2250/26; B60L 2260/20; H02J 7/0048; H02J 2310/48; H02J 7/007182; H02J 7/0013; H02J 7/0063
See application file for complete search history.

(56) References Cited

U.S. PATENT DOCUMENTS

2017/0113564 A1* 4/2017 Unno .................... H02J 7/0071
2018/0050681 A1* 2/2018 Oh ...................... G01R 31/3828

FOREIGN PATENT DOCUMENTS

JP  2017169311 A  9/2017

* cited by examiner

Primary Examiner — Ryan Johnson
(74) Attorney, Agent, or Firm — CKC & Partners Co., LLC (57) ABSTRACT

A power supply system includes: a first power circuit having a first battery, a second power circuit having a second battery, a voltage converter which converts voltage between the first power circuit and the second power circuit, a power converter which converts power between the first power circuit and the drive motor, a power control unit which controls charge/discharge of the first and second batteries by operating the voltage converter and the power converter, a first voltage parameter acquisition unit which calculates an effective value for the closed circuit voltage of the first battery as a first voltage parameter, a second voltage parameter acquisition unit which calculates the static voltage of the second battery as a second voltage parameter, in which the power control unit causes power to discharge from the second battery so that the second voltage parameter becomes no more than the first voltage parameter.

4 Claims, 8 Drawing Sheets

POWER SUPPLY SYSTEM

This application is based on and claims the benefit of priority from Japanese Patent Application No. 2021-046084, filed on 19 Mar. 2021, the content of which is incorporated herein by reference.

BACKGROUND OF THE INVENTION

Field of the Invention

The present invention relates to a power supply system. In more detail, it relates to a power supply system for an electric vehicle including two electrical storage devices.

Related Art

In recent years, development has been active in electric vehicles such as electric transport equipment equipped with a drive motor as a power generation source, and hybrid vehicles equipped with a drive motor and internal combustion engine as power generation sources. In such electric vehicles, power supply devices such as an electrical storage device (battery, capacitor, etc.) and fuel cell for supplying electrical energy to the drive motor is also built in. In addition, in recent years, a vehicle equipped with a plurality of power supply devices having different characteristics in an electric vehicle has also been developed.

Cited Document 1 shows a power supply system for an electric vehicle including a power circuit which connects a drive unit configured from a drive motor, inverter, etc. with a first electrical storage device; a second electrical storage device connected with this power circuit via a voltage converter; and a control device which performs switching control of this voltage converter. The control device sets a target current for the passing current, which is electrical current passing through the voltage converter according to a request from the driver, and performs the switching control of the voltage converter so that the passing current becomes the target current, combines the power outputted from the first electrical storage device and the power outputted from the second electrical storage device, and then supplies this to the drive motor.

Patent Document 1: Japanese Unexamined Patent Application, Publication No. 2017-169311

SUMMARY OF THE INVENTION

In the case of connecting two electrical storage devices by a voltage converter as in this power supply system, the power outputted from the second electrical storage device can basically be controlled by switching control of the voltage converter. However, when great power is requested by the drive motor as during acceleration, for example, the electrical current flowing in the first electrical storage device increases, and the closed circuit voltage of the first electrical storage device may become lower than the static voltage of the second electrical storage device. In this case, the second turns to discharge, and unintended electrical current may flow through the voltage converter from the second electrical storage device side to the first electrical storage device side.

The present invention has an object of providing a power supply system which can suppress unintended discharge from the second electrical storage device, in a voltage converter connecting a high-voltage first electrical storage device and a low-voltage second electrical storage device.

A power supply system (for example, the power supply system 1 described later) according to a first aspect of the present invention includes: a first power circuit (for example, the first power circuit 2 described later) having a first electrical storage device (for example, the first battery B1 described later); a second power circuit (for example, the second power circuit 3 described later) having a second electrical storage device (for example, the second battery B2 described later) having a use voltage range relative to a closed circuit voltage which overlaps the first electrical storage device and a static voltage which is lower than the first electrical storage device; a voltage converter (for example, the voltage converter 5 described later) which converts voltage between the first power circuit and the second power circuit; a power converter (for example, the power converter 43 described later) which converts power between the first power circuit and a rotary electrical machine (for example, the drive motor M described later); a power control unit (for example, the electronic control unit group 7 described later) for controlling charge/discharge of the first electrical storage device and the second electrical storage device by operating the voltage converter and the power converter; a first voltage parameter acquisition unit (for example, the management ECU 71, first battery ECU 74, and first battery sensor unit 81 described later) for acquiring a first voltage parameter (for example, the first voltage parameter CCV1 described later) corresponding to a closed circuit voltage of the first electrical storage device; and a second voltage parameter acquisition unit (for example, the second battery ECU 75 and second battery sensor unit 82 described later) for acquiring a second voltage parameter (for example, the second voltage parameter OCV2 described later) corresponding to a static voltage of the second electrical storage device, in which the power control unit causes power to be discharged from the second electrical storage device so that the second voltage parameter becomes no more than the first voltage parameter.

According to a second aspect of the present invention, in this case, the power supply system preferably further includes: a first remaining amount parameter acquisition unit (for example, the first battery ECU 74 and first battery sensor unit 81 described later) for acquiring a first remaining amount parameter (for example, the first SOC described later) which varies according to a remaining amount of the first electrical storage device; and a first output upper limit acquisition unit (for example, the first battery ECU 74 and the first battery sensor unit 81 described later) for acquiring a first output upper limit (for example, the first output upper limit P1_lim described later), which is an output upper limit of the first electrical storage device; in which the second electrical storage device has higher output density and lower energy density than the first electrical storage device; in which the power control unit, in a case of the first remaining amount parameter being at least a remaining amount threshold (for example, the lamp lighting threshold described later), causes power to be discharged from the second electrical storage device so that the second voltage parameter becomes no more than the first voltage parameter, and in a case of the first remaining amount parameter being less than the remaining amount threshold and the first output upper limit being greater than an output threshold (for example, the output threshold Pe0 described later), limits discharge of the second electrical storage device more than a case of the first remaining amount parameter being at least the remaining amount threshold.

According to a third aspect of the present invention, in this case, it is preferable for the first voltage parameter acquisition unit to acquire an effective value of closed circuit voltage of the first electrical storage device, as the first voltage parameter.

According to a fourth aspect of the present invention, in this case, it is preferable for the first voltage parameter acquisition unit to acquire the closed circuit voltage of the first electrical storage device when power corresponding to the output threshold is being outputted from the first electrical storage device, as the first voltage parameter.

The power supply system of the first aspect of the present invention connects the first power circuit having the first electrical storage device and the second power circuit having the second electrical storage device having a use voltage range relative to the closed circuit voltage that overlaps the first electrical storage device and a static voltage lower than the first electrical storage device by the voltage converter, and connects the first power circuit and the rotary electrical machine by the power converter. The power control unit controls the charge/discharge of the first electrical storage device and second electrical storage device by operating the power converter and voltage converter. Herein, in the case of wanting to inhibit or suppress discharge from the second electrical storage device for any reason, the power control unit operates the voltage converter and/or power converter so that all or a majority of the requested power for the rotary electrical machine is covered by the power outputted from the first electrical storage device. However, when electrical current flowing in the first electrical storage device increases, there are cases where the closed circuit voltage of the first electrical storage device becomes lower than the static voltage of the second electrical storage device, and unintended power is outputted from the second electrical storage device. To address this, the present invention acquires the first voltage parameter corresponding to the closed circuit voltage of the first electrical storage device by the first voltage parameter acquisition unit, acquires the second voltage parameter corresponding to the static voltage of the second electrical storage device by the second voltage parameter acquisition unit, and the power control unit then causes power to discharge from the second electrical storage device so that the second voltage parameter becomes no more than the first voltage parameter. Consequently, according to the present invention, it is possible to prevent that second electrical storage device from turning to unintended discharge by the static voltage of the second electrical storage device falling below the closed circuit voltage of the first electrical storage device.

In the second aspect of the present invention, with the electric vehicle traveling by way of the power of the aforementioned two such electrical storage devices, in the case of the system output upper limit made by combining the output upper limit of the first electrical storage device and the output upper limit of the second electrical storage device becoming less than a predetermined output threshold, it may set the remaining travelable distance as 0. In Japanese Patent Application No. 2020-061200 by the present applicant shows technology which, in a power supply system establishing the first electrical storage device as capacity type and the second electrical storage device as output type, prevents the output upper limit of the second electrical storage device from rapidly decreasing prior to using up the power stored in the first electrical storage device, and the remaining travelable distance suddenly dropping to 0. With this power supply system shown in Japanese Patent Application No. 2020-061200, the discharge of the second electrical storage device is limited more in the case of the first remaining amount parameter of the first electrical storage device being less than a remaining amount threshold and the first output upper limit being greater than the output threshold, than a case of the first remaining amount parameter being greater than the remaining amount threshold. The power supply system shown in Japanese Patent Application No. 2020-061200 can thereby use up the power stored in the first electrical storage device and extend the travel distance, since it is possible to secure auxiliary power in the second electrical storage device until the first output upper limit of the first electrical storage device falls below the output threshold (hereinafter such control is also referred to as "range extending control").

In contrast, with the present invention, in the case of the first remaining amount parameter being at least the remaining amount threshold, the power control unit executes active discharge control causing power to be discharged from the second electrical storage device so that the second voltage parameter becomes no more than the first voltage parameter, and in the case of the first remaining amount parameter being less than the remaining amount threshold, executes the range extending control accompanying limitation of discharge of the second electrical storage device in the aforementioned way. In the case of excessive power being stored in the second electrical storage device in the time until starting range extending control for using up the power stored in the first electrical storage device, it is thereby possible to actively reduce the remaining amount of the second electrical storage device so that unintended power is not discharged from the second electrical storage device during execution of range extending control.

In the third aspect of the present invention, the first voltage parameter acquisition unit acquires the effective value of the closed circuit voltage of the first electrical storage device as the first voltage parameter. The instantaneous value of the closed circuit voltage of the first electrical storage device varies according to the load fluctuation including the rotary electrical machine. To address this, the present invention can prevent degradation of the driving performance by excessively suppressing discharge from the second electrical storage device, by setting the effective value for the closed circuit voltage of the first electrical storage device as the first voltage parameter.

In the fourth aspect of the present invention, the first voltage parameter acquisition unit acquires the closed circuit voltage of the first electrical storage device when power corresponding to the output threshold is being outputted from the first electrical storage device, as the first voltage parameter. According to the present invention, by executing the active discharge control until the second voltage parameter becomes no more than the first voltage parameter defined in this way, it is possible to more reliably prevent unintended power from being discharged from the second electrical storage device during execution of range extending control.

DETAILED DESCRIPTION OF THE INVENTION

Figure 1:
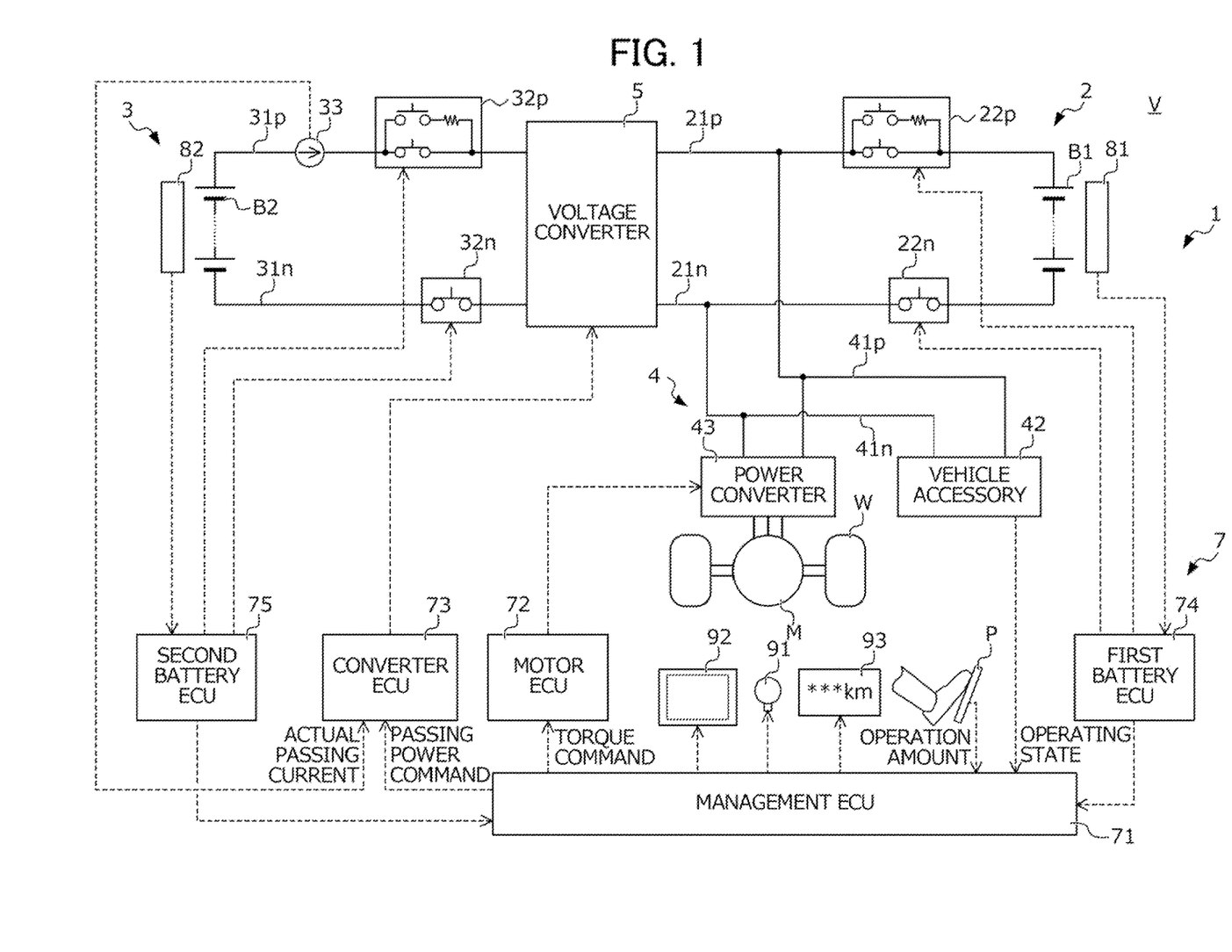
FIG. 1 is a view showing the configuration of a vehicle equipped with a power supply system according to an embodiment of the present invention.

Hereinafter, an embodiment of the present invention will be explained while referencing the drawings. FIG. 1 is a view showing the configuration of an electric vehicle V (hereinafter simply referred to as "vehicle") equipped with a power supply system 1 according to the present embodiment.

The vehicle V includes drive wheels W, a drive motor M serving as a rotary electrical machine coupled to these drive wheels W; and a power supply system 1 which performs transferring of power between this drive motor M and a first battery B1 and second battery B2 described later. It should be noted that the present embodiment explains an example in which the vehicle V accelerates and decelerates by the motive power generated mainly by the drive motor M; however, the present invention is not to be limited thereto. The vehicle V may be established as a so-called hybrid vehicle equipped with the drive motor M and an engine as the motive power generation source.

The drive motor M is coupled to the drive wheels W via a power transmission system which is not illustrated. The torque generated by the drive motor M by supplying three-phase electricity to the drive motor M from the power supply system 1 is transferred to the drive wheels W via the power transmission system which is not illustrated, causing the drive wheels W to rotate to make the vehicle V travel. In addition, the drive motor M exhibits a function of a generator during deceleration of the vehicle V, generates regenerative electric power, and gives the regenerative braking torque to the drive wheels W responsive to the magnitude of this regenerative electric power. The regenerative electric power generated by the drive motor M is charged to the batteries B1, B2 of the power supply system 1 as appropriate.

The power supply system 1 includes: a first power circuit 2 to which the first battery B1 is connected; a second power circuit 3 to which the second battery B2 is connected; a voltage converter 5 connecting this first power circuit 2 and second power circuit 3; a load circuit 4 having various electrical loads including the drive motor M; and an electronic control unit group 7 which controls the flow of power to these circuits 2, 3, 4 and the charge/discharge of the batteries B1 and B2, by operating these power circuits 2, 3, 4 and the voltage converter 5. The electronic control unit group 7 includes a management ECU 71, motor ECU 72, converter ECU 73, first battery ECU 74 and second battery ECU 75, which are each computers.

The first battery B1 is a secondary battery capable of both discharging which converts chemical energy into electrical energy, and charging which converts the electrical energy into chemical energy. Hereinafter, a case is explained using a so-called lithium-ion battery which performs charging/ discharging by the lithium ions migrating between electrodes as this first battery B1; however, the present invention is not limited thereto.

A first battery sensor unit 81 for estimating the internal state of the first battery B1 is provided to the first battery B1. The first battery sensor unit 81 detects a physical quantity required in order to acquire the charge rate corresponding to a remaining amount of the first battery B1 (value expressing the charged amount of the battery by percentage;), the temperature, etc. in the first battery ECU 74, and is configured by a plurality of sensors which send signals according to the detection value to the first battery ECU 74. More specifically, the first battery sensor unit 81 is configured by a voltage sensor that detects the terminal voltage of the first battery B1, a current sensor that detects the electrical current flowing in the first battery B1, a temperature sensor that detects the temperature of the first battery B1, etc.

The second battery B2 is a secondary battery capable of both discharging that converts chemical energy into electrical energy, and charging that converts electrical energy into chemical energy. Hereinafter, a case is explained using a so-called lithium-ion battery which performs charging/discharging by the lithium ions migrating between electrodes as this second battery B2; however, the present invention is not limited thereto. The second battery B2 may employ capacitors, for example.

A second battery sensor unit 82 for estimating the internal state of the second battery B2 is provided to the second battery B2. The second battery sensor unit 82 detects a physical quantity required for acquiring the charge rate, temperature, etc. of the second battery B2 in the second battery ECU 75, and is configured by a plurality of sensors which send signals according to the detection value to the second battery ECU 75. More specifically, the second battery sensor unit 82 is configured by a voltage sensor that detects terminal voltage of the second battery B2, a current sensor that detects the electrical current flowing in the second battery B2, a temperature sensor that detects the temperature of the second battery B2, etc.

Herein, the characteristics of the first battery B1 and the characteristics of the second battery B2 are compared. The first battery B1 has lower output weight density and higher energy weight density than the second battery B2. In addition, the first battery B1 has larger capacity than the second battery B2. In other words, the first battery B1 is superior to the second battery B2 in the point of energy weight density. It should be noted that energy weight density is the electrical energy per unit weight (Wh/kg), and the output weight density is the power per unit weight (W/kg). Therefore, the first battery B1 which excels in the energy weight density is a capacitive battery with the main object of high capacity and the second battery B2 which excels in output weight density is an output-type battery with the main object of high output. For this reason, the power supply system 1 uses the first battery B1 as the main power source, and uses the second battery B2 as an auxiliary power source which supplements the first battery B1.

Figure 2:
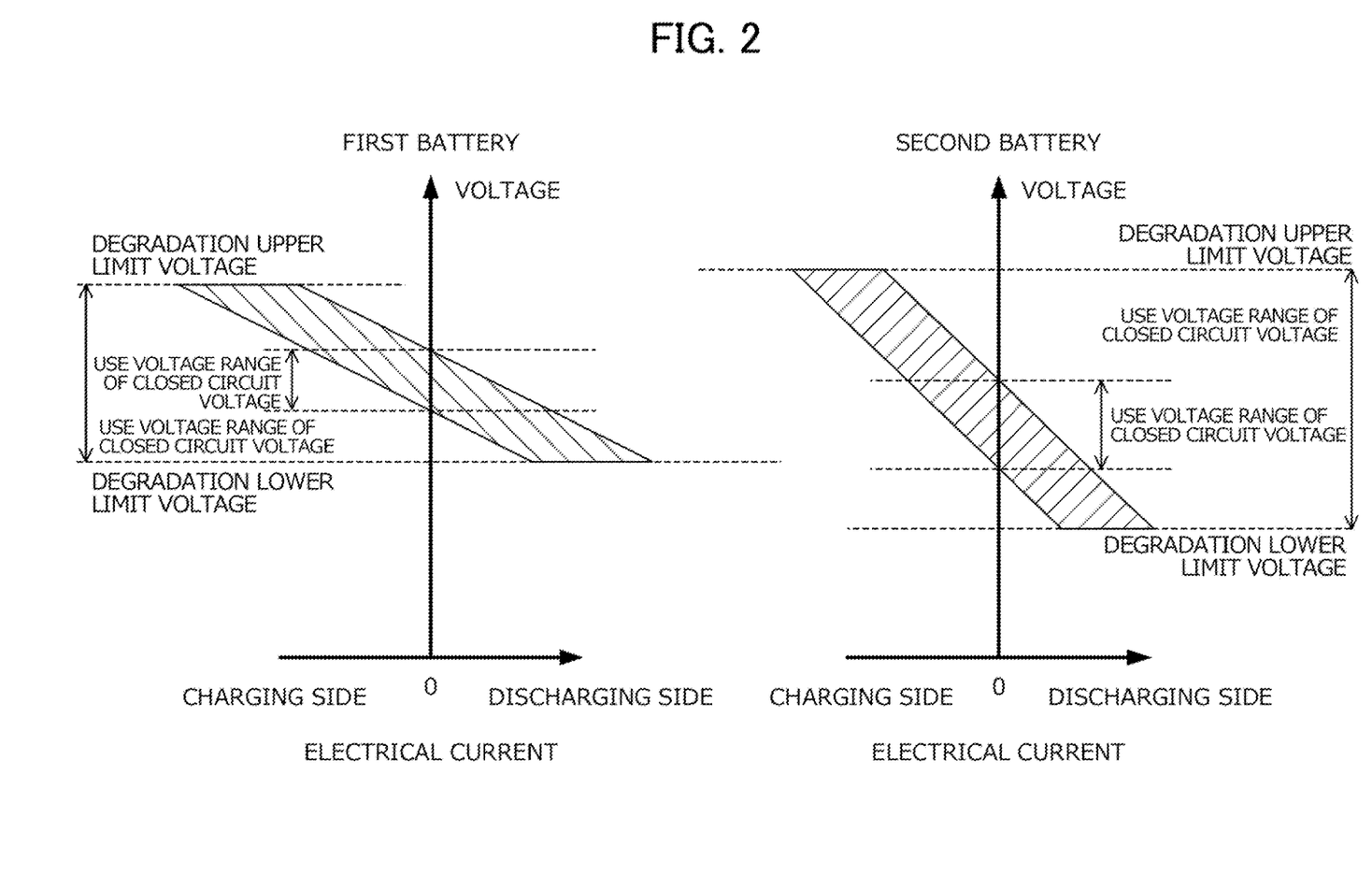
FIG. 2 provides graphs comparing use voltage ranges of a first battery and a second battery.

FIG. 2 provides graphs comparing the use voltage ranges of the first battery B1 and second battery B2 in the power supply system 1. In FIG. 2, the left side is a graph showing the use voltage range of the first battery B1, and the right side is a graph showing the use voltage range of the second battery B2. In FIG. 2, the horizontal axis showing the electrical current flowing in the battery, and the vertical axis shows the voltage of the battery.

As shown in FIG. 2, the static voltage of the batteries B1, B2 (i.e. voltage in a state in which electrical current is not flowing to the battery, referred to as open circuit voltage) has a characteristic of rising with higher charge rate. Therefore, the upper limit for the use voltage ranges relative to static voltage of the batteries B1, B2 are static voltages of each when the charge rate is the maximum value (e.g., 100%), and the lower limit is the static voltage of each when the charge rate is the minimum value (e.g., 0%). As shown in FIG. 2, the upper limit for the use voltage range relative to static voltage of the second battery B2 is lower than the upper limit for the use voltage range relative to the static voltage of the first battery B1. For this reason, the static voltage of the second battery B2 during travel of the vehicle V is basically maintained lower than the static voltage of the first battery B1.

As shown in FIG. 2, there is a characteristic in which the closed circuit voltage of the batteries B1, B2 (i.e. voltage in a state in which electrical current is flowing to the battery) also rises with higher charge rate. In addition, since internal resistance exists in the batteries B1, B2, the closed circuit voltage thereof has a characteristic of lowering from the static voltage as the discharge current increases, and rising from the static voltage as the charge current increases. Therefore, the upper limit of the use voltage range for the closed circuit voltage of the batteries B1, B2 is higher than the upper limit of the use voltage range for each static voltage, and the lower limit is lower than the lower limit of the use voltage range relative to each static voltage. In other words, the use voltage range for the closed circuit voltage of the batteries B1, B2 includes the use voltage range for each static voltage. As shown in FIG. 2, the use voltage range for the closed circuit voltage of the first battery B1 overlaps the use voltage range for the closed circuit voltage of the second battery B2.

In addition, since the degradation of the batteries B1, B2 is promoted when the charge current increases excessively, the upper limit of the use voltage range for the closed circuit voltage of these batteries B1, B2 is set so that these batteries B1, B2 will not degrade, based on the states of these batteries B1, B2. Hereinafter, the upper limit of the use range of the closed circuit voltage of these batteries B1, B2 is also referred to as degradation upper limit voltage.

In addition, when the discharge current increases excessively, since the degradation of the batteries 81, 82 is promoted, the lower limit of the use voltage range for the closed circuit voltage of these batteries B1, B2 is set so that these batteries B1, B2 will not degrade, based on the states of these batteries B1, B2. Hereinafter, the lower limit of the use range of the closed circuit voltage of these batteries B1, B2 is also referred to as degradation lower limit voltage.

Referring back to FIG. 1, the first output circuit 2 includes: the first battery B1, first power lines 21p, 21n which connect both positive and negative poles of this first battery B1 and the positive terminal and negative terminal on the high-voltage side of the voltage converter 5, and a positive contactor 22p and negative contactor 22n provided to these first power lines 21p, 21n.

The contactors 22p, 22n are normal open type which opens in a state in which a command signal from outside is not being inputted and breaks conduction between both electrodes of the first battery B1 and the first power lines 21p, 21n; and closes in a state in which a command signal is being inputted and connects the first battery B1 and first power lines 21p, 21n. These contactors 22p, 22n open/close according to a command signal transmitted from the first battery ECU 74. It should be noted that the positive contactor 22p is a pre-charge contactor having a pre-charge resistance for mitigating the inrush current to a plurality of smoothing capacitors provided to the first power circuit 2, load circuit 4, etc.

The second power circuit 3 includes: the second battery B2, second power lines 31p, 31n which connect both positive and negative poles of this second battery B2 and the positive terminal and negative terminal on the low-voltage side of the voltage converter 5, a positive contactor 32p and negative contactor 32n provided to these second power lines 31p, 31n, and a current sensor 33 provided to the second power line 31p.

The contactors 32p, 32n are normal-open type which open in a state in which a command signal from outside is not being inputted to break conduction between both electrodes of the second battery B2 and the second power lines 31p, 31n, and close in a state in which a command signal is being inputted to connect between the second battery B2 and the second power lines 31p, 31n. These contactors 32p, 32n open/close in response to a command signal transmitted from the second battery ECU 75. It should be noted that the negative contactor 32p is a pre-charge contactor having a pre-charge resistance for mitigating the inrush current to a plurality of smoothing capacitors provided to the first power circuit 2, load circuit 4, etc.

The electric current sensor 33 sends a detection signal according to a value of passing current, which is the electrical current flowing through the second power line 31p, i.e. electrical current flowing through the voltage converter 5, to the converter ECU 73. It should be noted that, in the present embodiment, the direction of passing current defines from the second power circuit 3 side to the first power circuit 2 side as positive, and defines from the first power circuit 2 side to the second power circuit 3 side as negative.

The load circuit 4 includes: a vehicle accessory 42, output converter 43 to which the drive motor M is connected, and load power lines 41p, 41n which connect this vehicle accessory 42 and output converter 43 with the first power circuit 2.

The vehicle accessory 42 is configured by a plurality of electrical loads such as a battery heater, air compressor, DC/DC converter, and onboard charger. The vehicle accessory 42 is connected to the first power lines 21p, 21n of the first power circuit 2 by the load power lines 41p, 41n, and operates by consuming the electric power of the first power lines 21p, 21n. The information related to the operating state of various electrical loads constituting the vehicle accessory 42 is sent to the management ECU 71, for example.

The power converter 43 is connected to the first power lines 21p, 21n so as to be parallel with the vehicle accessory 42, by the load power lines 41p, 41n. The power converter 43 converts the electric power between the first power lines 21p, 21n and the drive motor M. The power converter 43, for example, is a PWM inverter according to pulse width modulation, provided with a bridge circuit configured by a bridge connecting a plurality of switching elements (e.g., IGBT), and is equipped with a function of converting between DC power and AC power. The power converter 43 is connected to the first power lines 21p, 21n on the DC I/O side thereof, and is connected to each coil of the U phase, V phase and W phase of the drive motor M at the AC I/O side thereof. By ON/OFF driving the switching elements of each phase in accordance with a gate drive signal generated at a predetermined timing from a gate drive circuit (not shown) of the motor ECU 72, the power converter 43 converts the DC power of the first power lines 21p, 21n into three-phase AC power and supplies to the drive motor M, and converts the three-phase AC power supplied from the drive motor M into DC power and supplies to the first power lines $21p$, $21n$.

The voltage converter 5 connects the first power circuit 2 and second power circuit 3, and converts the voltage between both circuits 2, 3. A known boost circuit is used in this voltage converter 5.

Figure 3:
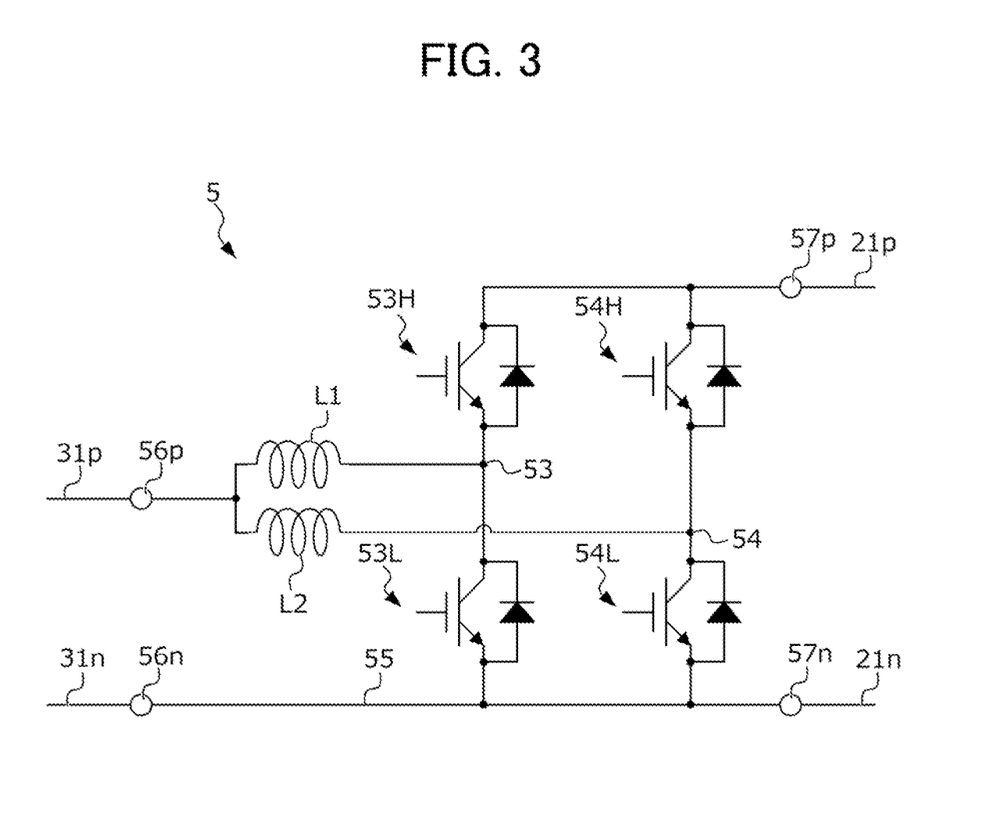
FIG. 3 is a view showing an example of the circuit configuration of a voltage converter.

FIG. 3 is a view showing an example of the circuit configuration of the voltage converter 5. The voltage converter 5 connects the first power lines $21p$, $21n$ to which the first battery B1 is connected, and the second power lines $31p$, $31n$ to which the second battery B2 is connected, and converts the voltage between these first power lines $21p$, $21n$ and second power lines $31p$, $31n$. The voltage converter 5 is a full-bridge DC/DC converter configured by combining a first reactor L1, a second reactor L2, a first high-arm element 53H, a first low-arm element 53L, a second high-arm element 54H, a second low-arm element 54L, a negative bus 55, low-voltage side terminals $56p$, $56n$, high-voltage side terminals $57p$, $57n$, and a smoothing capacitor (not shown).

The low-voltage side terminals $56p$, $56n$ are connected to the second power lines $31p$, $31n$, and the high-voltage side terminals $57p$, $57n$ are connected to the first power lines $21p$, $21n$. The negative bus 55 is wiring connecting the low-voltage side terminal $56n$ and high-voltage side terminal $57n$.

The first reactor L1 has one end side thereof connected to the low-voltage side terminal $56p$, and the other end side connected to a connector node 53 between the first high-arm element 53H and first low-arm element 53L. The first high-arm element 53H and first low-arm element 53L each include a well-known power switching element such as IGBT or MOSFET, and a freewheeling diode connected to this power switching element. This high-arm element 53H and low-arm element 53L are connected in this order in series between the high-voltage side terminal $57p$ and negative bus 55.

A collector of the power switching element of the first high-arm element 53H is connected to the high-voltage side terminal $57p$, and the emitter thereof is connected to the collector of the first low-arm element 53L. The emitter of the power switching element of the first low-arm element 53L is connected to the negative bus 55. The forward direction of the freewheeling diode provided to the first high-arm element 53H is a direction from the first reactor L1 towards the high-voltage side terminal $57p$. In addition, the forward direction of the freewheeling diode provided to the first low-arm element 53L is a direction from the negative bus 55 towards the first reactor L1.

The second reactor L2 has one end side connected to the low-voltage side terminal $56p$, and the other end side connected to a connection node 54 between the second high-arm element 54H and second low-arm element 54L. The second high-arm element 54H and second low-arm element 54L each include a well-known power switching element such as IGBT or MOSFET, and a freewheeling diode connected to this power switching element. This high-arm element 54H and low-arm element 54L are connected in this order in series between the high-voltage side terminal $57p$ and negative bus 55.

A collector of the power switching element of the second high-arm element 54H is connected to the high-voltage side terminal $57p$, and the emitter thereof is connected to the collector of the second low-arm element 54L. The emitter of the power switching element of the second low-arm element 54L is connected to the negative bus 55. The forward direction of the freewheeling diode provided to the second high-arm element 54S is a direction from the second reactor L2 towards the high-voltage side terminal $57p$. In addition, the forward direction of the freewheeling diode provided to the second low-arm element 54L is a direction from the negative bus 55 towards the second reactor L2.

The voltage converter 5 converts the voltage between the first power lines $21p$, $21n$ and the second power lines $31p$, $31n$, by alternately driving ON/OFF the first high-arm element 53H and second low-arm element 54L, and the first low-arm element 53L and second high-arm element 54, in accordance with the gate drive signal generated at a predetermined timing from a gate drive circuit (not shown) of the converter ECU 73.

The static voltage of the second battery B2 is basically maintained lower than the static voltage of the first battery B1. Therefore, the voltage of the first power lines $21p$, $21n$ is basically higher than the voltage of the second power lines $31p$, $31n$. Therefore, the converter ECU 73, in a case of driving the drive motor M using both the power outputted from the first battery B1 and the power outputted from the second battery B2, operates the voltage converter 5 so that a boost function is exhibited in the voltage converter 5. Boost function refers to a function of stepping up the power of the second power lines $31p$, $31n$ to which the low-voltage side terminals $56p$, $56n$ are connected, and outputting to the first power lines $21p$, $21n$ to which the high-voltage side terminals $57p$, $57n$ are connected, whereby positive passing current flows from the second power lines $31p$, $31n$ side to the first power lines $21p$, $21n$ side. In addition, in the case of suppressing discharge of the second battery B2, and driving the drive motor M with only the power outputted from the first battery B1, the converter ECU 73 is configured so as to turn OFF the voltage converter 5, and make so that electrical current does not flow from the first power lines $21p$, $21n$ to the second power lines $31p$, $31n$.

In addition, in the case of charging the first battery B1 or second battery B2 by the regenerative electric power outputted from the drive motor M to the first power lines $21p$, $21n$ during deceleration, the converter ECU 73 operates the voltage converter 5 so as to exhibit a step-down function in the voltage converter 5. Step-down function refers to a function of stepping down the electric power in the first power lines $21p$, $21n$ to which the high-voltage side terminals $57p$, $57n$ are connected, and outputting to the second power lines $31p$, $31n$ to which the low-voltage side terminals $56p$, $56n$ are connected, whereby negative passing current flows from the first power lines $21p$, $21n$ side to the second power lines $31p$, $31n$ side.

Referring back to FIG. 1, the first battery ECU 74 is a computer mainly handling state monitoring of the first battery B1 and the ON/OFF operation of the contactors $22p$, $22n$ of the first power circuit 2. The first battery ECU 74, based on a known algorithm using the detection value sent from the first battery sensor unit 81, calculates various parameters representing the internal state of the first battery B1, more specifically, the temperature of the first battery B1, internal resistance of the first battery B1, static voltage of the first battery B1, closed circuit voltage of the first battery B1, first output upper limit corresponding to the power which can be outputted from the first battery B1, first SOC corresponding to the charge rate of the first battery B1, etc. From the above, in the present embodiment, the first output upper limit acquisition unit for acquiring the first output upper limit which is the output upper limit of the first battery B1 is configured from the first battery sensor unit 81 and the first battery ECU 74. In addition, in the present embodiment, the first remaining amount parameter acquisition unit for acquiring the first SOC as a first remaining amount parameter which varies according to the remaining amount of the first battery B1 is configured by the first battery sensor unit 81 and the first battery ECU 74. Information related to a parameter representing the internal state of the first battery B1 acquired in the first battery ECU 74 is sent to the management ECU 71, for example.

The second battery ECU 75 is a computer mainly handling state monitoring of the second battery B2 and the ON/OFF operation of the contactors 32p, 32n of the second power circuit 3. The second battery ECU 75, based on a known algorithm using the detection value sent from the second battery sensor unit 82, calculates various parameters representing the internal state of the second battery B2, more specifically, the temperature of the second battery B2, internal resistance of the second battery B2, static voltage of the second battery B2, closed circuit voltage of the second battery B2, second output upper limit corresponding to the power which can be outputted from the second battery B2, second SOC corresponding to the charge rate of the second battery B2, etc. From the above, in the present embodiment, the second voltage parameter acquisition unit for acquiring static voltage of the second battery B2 is configured from the second battery sensor unit 82 and the second battery ECU 75. Information related to parameters representing the internal state of the second battery B2 acquired in the second battery ECU 75 is sent to the management ECU 71, for example.

The management ECU 71 is a computer managing mainly the flow of power in the overall power supply system 1. The management ECU 71 generates a torque command signal corresponding to a command related to the torque generated by the drive motor M, and a converter passing power command signal corresponding to a command related to converter passing power, which is power passing through the voltage converter 5, by executing the power management processing explained by referencing FIG. 4 later.

In addition, a charge request lamp 91, monitor 92, and remaining mileage meter 93 are connected to the management ECU 71. This charge request lamp 91, monitor 92 and remaining mileage meter 93 are each provided at positions visible to the driver.

The charge request lamp 91 is one notification unit for prompting charging of the first battery B1 to the driver. The management ECU 71 turns off the charge request lamp 91 in the case of the first SOC being greater than a predetermined lamp lighting threshold (for example, refer to FIG. 6 described later), and illuminates the charge request lamp 91 in the case of the first SOC becoming no more than the lamp lighting threshold. Charging of the first battery B1 is thereby prompted to the driver. It should be noted that, since the first SOC and first output upper limit are in a roughly proportional relationship, the management ECU 71 may cause the charge request lamp 91 to turn off or illuminate by comparing the first output upper limit with the predetermined threshold.

The remaining mileage meter 93 is one notification unit for notifying the remaining travelable distance, which is the distance that can be travelled, to the driver. The management ECU 71 calculates the remaining travelable distance by a known algorithm made using the first SOC, second SOC, first output upper limit and second output upper limit, and displays the numerical value thereof on the remaining mileage meter 93. Herein, the management ECU 71 sets the remaining travelable distance as 0, in the case of the system output upper limit, which is the sum of the first output upper limit and second output upper limit, being less than a predetermined output threshold (for example, refer to FIG. 8 described later).

The monitor 92 is an information display device which notifies the state of the power supply system 1 to the driver, by displaying warning information related to the state of the power supply system 1 by characters, images, etc. It should be noted that the contents of this warning information and the timing at which displaying warning information on the monitor 92 will be explained while referencing FIG. 5 later.

The monitor ECU 72 is a computer which mainly operates the power converter 43 to control the flow of power between the first power circuit 2 and the drive motor M, i.e. flow of inverter passing power which is power passing through the power converter 43. It should be noted that, hereinafter, the inverter passing power shall be positive in the case of power flowing from the first power circuit 2 to the drive motor M, i.e. during powered running of the drive motor M. In addition, the inverter passing power shall be negative in the case of power flowing from the drive motor M to the first power circuit 2, i.e. case of regenerative running of the drive motor M. The motor ECU 72 operates the power converter 43 so that torque according to this command generated in the drive motor M, based on the torque command signal calculated based on the command for the inverter passing power in the management ECU 71.

The converter ECU 73 is a computer which mainly operates the power converter 5, and controls the flow of power between the first power circuit 2 and second power circuit 3, i.e. flow of converter passing power which is power flowing in the voltage converter 5. It should be noted that, hereinafter, converter passing power shall be positive in the case of power flowing from the second power circuit 3 to the first power circuit 2, i.e. discharging power from the second battery B2, and supplying the first power circuit 2. In addition, the converter passing power shall be negative in the case of power flowing from the first power circuit 2 to the second power circuit 3, i.e. case of charging the second battery 82 with the power of the first power circuit 2. The converter ECU 73 operates the voltage converter 5 so that converter passing power according to the command passes through the voltage converter 5, in response to the converter passing power command signal sent from the management ECU 71. More specifically, the converter ECU 73 calculates the target electrical current, which is the target for the passing current in the voltage converter 5 based on the converter passing power command signal, and operates the voltage converter 5 following a known feedback control algorithm, so that the passing current detected by the current sensor 33 (hereinafter also referred to as "actual passing current") becomes the target electrical current.

Figure 4:
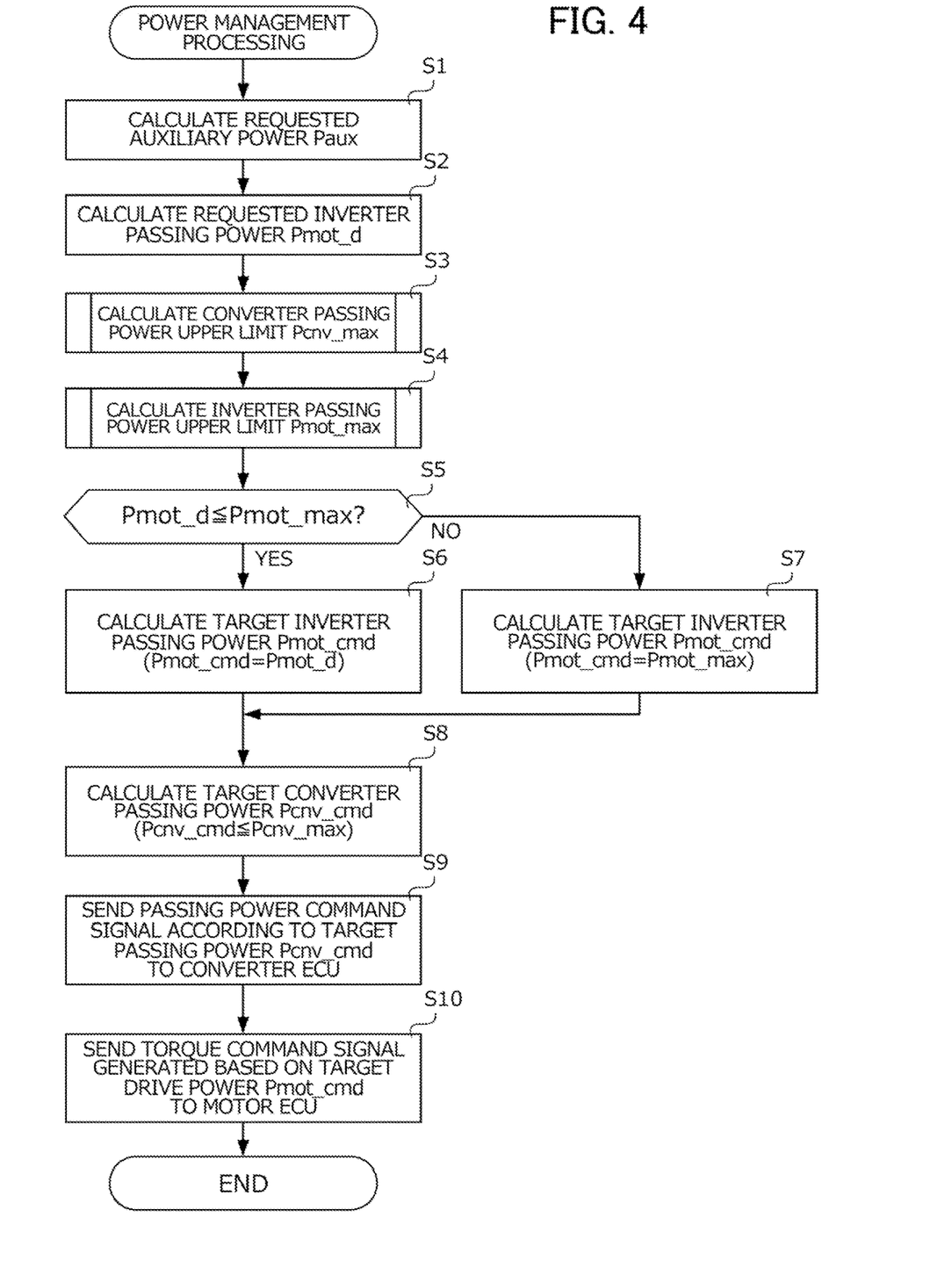
FIG. 4 is a flowchart showing a specific sequence of power management.

FIG. 4 is a flowchart showing a specific sequence of power management processing. This power management processing is repeatedly executed for a predetermined time period in the management ECU 71 until the remaining travelable distance becomes 0, i.e. system output upper limit becomes no more than the output threshold.

First, in Step S1, the management ECU 71 calculates the requested auxiliary power Paux, which is power requested for the vehicle accessory 42, and then advances to Step S2. The management ECU 71 calculates the requested auxiliary power Paux based on information related to the operating state of various electrical loads sent from the vehicle accessory 42.

In Step S2, the management ECU 71 calculates the requested inverter passing power Pmot_d corresponding to a request for inverter passing power of the power converter 43, and then advances to Step S3. The management ECU 71 calculates the requested drive torque from the driver, based on the operation amount of pedals such as the accelerator pedal and brake pedal by the driver (refer to FIG. 1), and calculates the requested inverter passing power Pmot_d by converting this requested drive torque into power.

In Step S3, the management ECU 71 calculates the converter passing power upper limit Pcnv_max corresponding to the upper limit for the converter passing power in the voltage converter 5, and then advances to Step S4. It should be noted that the specific sequence of calculating the converter passing power upper limit Pcnv_max will be explained in detail while referencing FIG. 5 later.

In Step S4, the management ECU 71 calculates the inverter passing power upper limit Pmot_max corresponding to the upper limit for the inverter passing power in the power converter 43, and then advances to Step S5. It should be noted that the specific sequence of calculating the inverter passing power upper limit Pmot_max will be explained in detail while referencing FIG. 6 later.

In Step S5, the management ECU 71 determines whether the requested inverter passing power Pmot_d is no more than the inverter passing power upper limit Pmot_max.

In the case of the determination result in Step S5 being YES (case of Pmot_d≤Pmot_maz), the management ECU 71 sets the requested inverter passing power Pmot_d calculated in Step S2 as the target inverter passing power Pmot_cmd corresponding to the target for the inverter passing power in the power converter 43 (refer to Step S6), and then advances to Step S8.

In the case of the determination result in Step S5 being NO (case of Pmot_d>Pmot_max), the management ECU 71 sets the inverter passing power upper limit Pmot_max calculated by the processing of Step S4 as the target inverter passing power Pmot_cmd (refer to Step S7), and then advances to Step S8.

In Step S8, the management ECU 71 advances to Step S9, after calculating the target converter passing power Pcnv_cmd corresponding to the target for the converter passing power in the voltage converter 5. More specifically, the management ECU 71 calculates the target converter passing power Pcnv_cmd, so as to be charged/discharged in a predetermined ratio from the first battery B1 and second battery B2, within a range no more than the converter passing power upper limit Pcnv_max.

In addition, the management ECU 71 sets the target converter passing power Pcnv_cmd as a positive value which is greater than 0 and no more than the converter passing power upper limit Pcnv_max, in the case of the value of an active discharge control request flag described later being "1". The management ECU 71 thereby executes active discharge control to discharge the power from the second battery B2 and cause the second SOC to actively decline, in the case of the active discharge control request flag described later being "1".

In addition, in range extending control described later, by setting the converter passing power upper limit Pcnv_max to smaller than the second output upper limit of the second battery B2, in the case of being while limiting the discharge of the second battery B2 from the second output upper limit (refer to Step S42 in FIG. 6 described later), and the second SOC being less than a predetermined target second SOC, the management ECU 71 preferably actively sets the target converter passing power Pcnv_cmd to less than 0, and actively charges the second battery B2 with the power of the first power circuit 2.

In Step S9, the management ECU 71 generates a converter passing power command signal according to the target converter passing power Pcnv_cmd calculated in Step S8, sends this to the converter ECU 7:3, and then advances to Step S10. Power according to the target converter passing power Pcnv_cmd is thereby charged/discharged in the second battery B2.

In Step S10, the management. ECU 71 generates a torque command signal based on the target inverter passing power Pmot_cmd calculated in Step S6 or S7, sends this to the motor ECU 72, and then ends the power management processing. More specifically, the management ECU 71 calculates the target drive torque by converting the target inverter passing power Pmot_cmd into torque, and generates a torque command signal according to this target drive torque. The motor ECU 72 operates the power converter 43 based on this torque command signal. Power according to the target inverter passing power Pmot_cmd thereby flows between the first power circuit 2 and the drive motor M.

Figure 5:
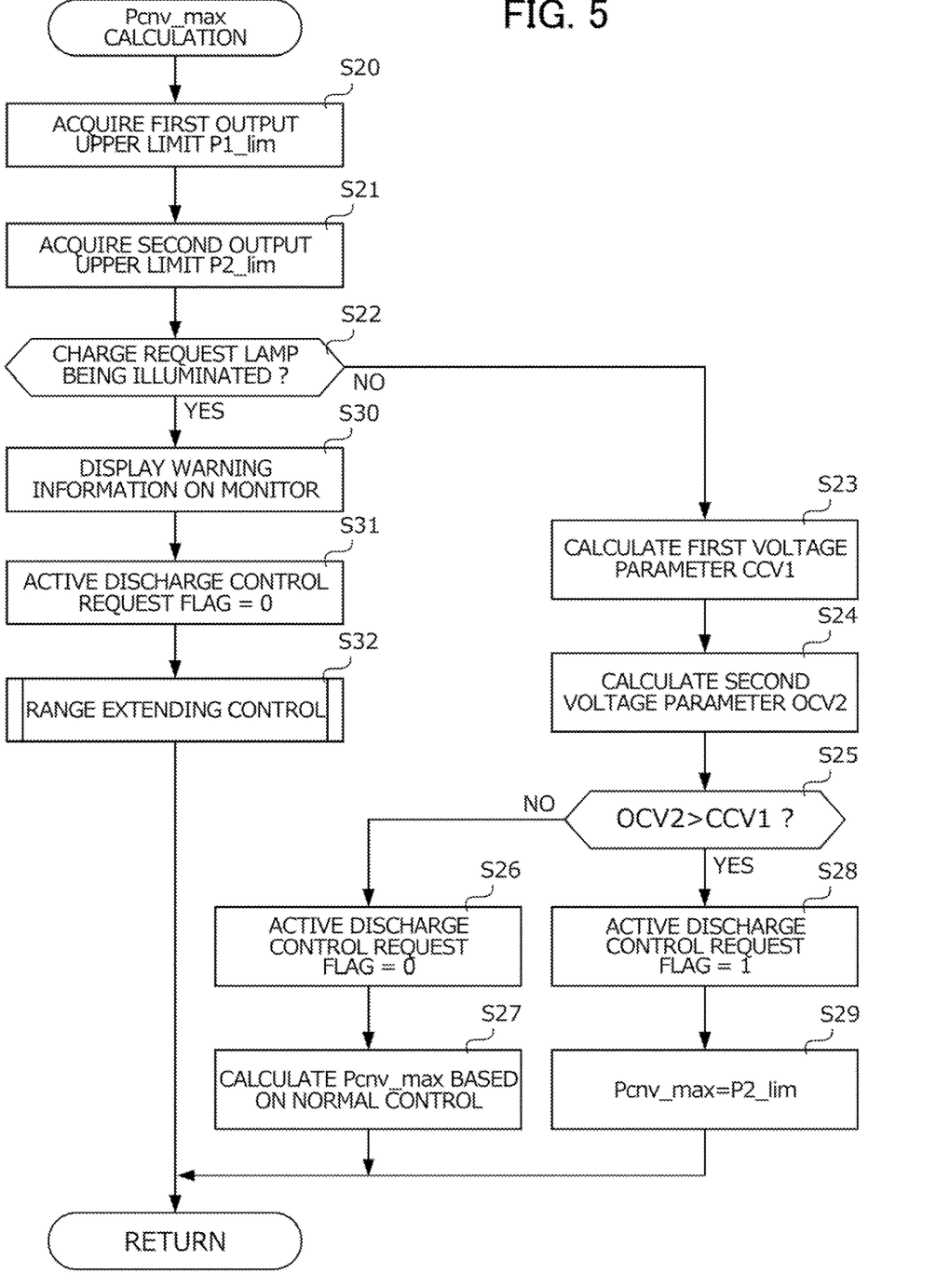
FIG. 5 is a flowchart showing a sequence of calculating a converter passing power upper limit.

FIG. 5 is a flowchart showing a sequence of calculating the converter passing power upper limit Pcnv_max.

First, in Step S20, the management ECU 71 acquires the first output upper limit P1_lim, and then advances to Step S21. Next, in Step S21, the management ECU 71 acquires the second output upper limit P2_lim, and then advances to Step S22. Next, in Step S22, the management ECU 71 determines whether the charge request lamp 91 is illuminated, i.e. whether first SOC is less than lamp lighting threshold.

The management ECU 71 advances to Step S23, in the case of the determination result in Step S22 being NO, i.e. case of first SOC being at least the lamp lighting threshold. In Step S23, the management ECU 71 acquires the first voltage parameter CCV1 corresponding to the closed circuit voltage of the first battery B1, and then advances to Step S24. Hereinafter, a case of the management ECU 71 calculating the effective value for the closed circuit voltage of the first battery B1 as the first voltage parameter CCV1 will be explained; however, the present invention is not limited thereto. The management ECU 71 may calculate, as the first voltage parameter CCV1, the closed circuit voltage of the first battery B1 when the power corresponding to the output threshold Pe0 in range extending control described later is being outputted from the first battery B1, for example.

In Step S24, the management ECU 71 acquires the second voltage parameter OCV2 corresponding to the static voltage of the second battery B2, and then advances to Step S25.

In Step S25, the management ECU 71 determines whether the second voltage parameter OCV2 is larger than the first voltage parameter CCV1. The management ECU 71 judges that there is no concern over unintended power being discharged from the second battery B2 in the case of the determination in Step S25 being NO, and then advances to Step S26. In Step S26, the management ECU 71 advances to Step S27 after resetting the value of the active discharge control request flag to "0". In Step S27, the management ECU 71 calculates the converter passing power upper limit Pcnv_max based on the passing control using the output upper limits P1_lim, P2_lim acquired in Steps S20 and S21, and then advances to the processing of Step S4 in FIG. 4.

The management ECU 71 judges that there is concern over unintended power being discharged from the second battery B2, in the case of the determination result in Step S25 being YES, and then advances to Step S28. In Step S28, the management ECU 71 advances to Step S29, after setting the value of the active discharge control request flag to "1" in order to start active discharge control causing power to actively discharge from the second battery B2, so that the second voltage parameter OCV2 becomes no more than the first voltage parameter CCV1. In Step 329, the management ECU 71 sets the second output upper limit P2_lim as the converter passing power upper limit Pcnv_max, and then advances to the processing of Step S4 in FIG. 4. The management ECU 71 thereby executes active discharge control (refer to Step S8 in FIG. 4).

The management ECU 71 advances to Step S30 in the case of the determination result in Step S22 being YES, i.e. case of first SOC being less than the lamp lighting threshold.

In Step S30, the management ECU 71 displays predetermined warning information on the monitor 92, and then advances to Step S31. As explained below, in the case of the first SOC being less than the lamp lighting threshold, since the output of the second battery B2 is limited, there is concern over no longer being able to realize the request of the driver, and the driver feeling uncomfortable. Therefore, in Step S30, the management ECU 71 displays a message of currently being a state in which output power to the drive motor is being limited, and a message for prompting to quickly charge the first battery B1, on the monitor 92.

In Step S31, the management ECU 71 advances to Step S32, after resetting the value of the active discharge control request flag to "0". In Step S32, the management ECU 71 calculates the converter passing power upper limit Pcnv_max by executing range extending control which will be explained by referencing FIG. 6, and then advances to the processing of Step S4 in FIG. 4.

Figure 6:
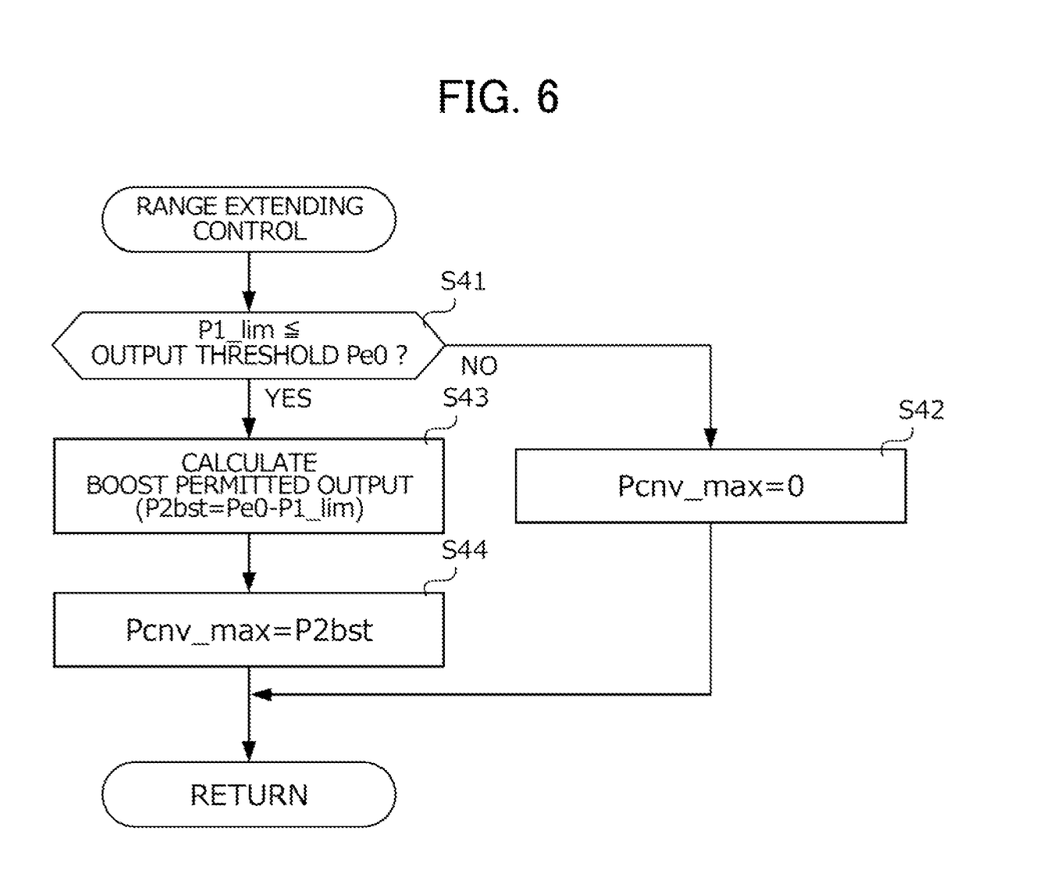
FIG. 6 is a flowchart showing a specific sequence of calculating a converter passing power upper limit by range extending control.

FIG. 6 is a flowchart showing a specific sequence of calculating the converter passing power upper limit Pcnv_max according to range extending control.

In Step S41, the management ECU 71 determines whether the first output upper limit P1_lim is no more than the output threshold Pe0. Herein, the output threshold Pe0 is set to a value of the minimum required power for a vehicle V requiring to charge the first battery B1 as soon as possible to travel to an urban area so as to be able to reach an external charging facility, for example.

The management ECU 71 advances to Step S42, in the case of the determination result in Step 341 being NO, i.e. case of the first SOC being less than the lamp lighting threshold (refer to Step S22 in FIG. 5), and the first output upper limit P1_lim being greater than the output threshold Pe0 (refer to Step S41 in FIG. 6). In Step S42, the management ECU 71 sets the converter passing power upper limit Pcnv_max as 0, i.e. inhibits discharge of the second battery B2, and then advances to the processing of Step S4 in FIG. 4.

The management ECU 71 advances to Step S43, in the case of the determination result in Step S41 being YES, i.e. case of the first SOC being less than the lamp lighting threshold (refer to Step S22 in FIG. 5), and the first output upper limit P1_lim being no more than the output threshold Pe0 (refer to Step S41 in FIG. 6). In Step S43, the management ECU 71 calculates a boost permitted output P2*bst* for the second battery B2, and then advances to Step S44. More specifically, the management ECU 71 calculates the boost permitted output P2*bst*, by subtracting the first output upper limit P1_lim from the output threshold Pe0 (P2*bst*=Pe0−P1_lim). In other words, the difference between the output threshold Pe0 and the first output upper limit P1_lim is set as the boost permitted output P2*bst*.

In Step S44, the management ECU 71 sets the boost permitted output P2*bst* as the converter passing power upper limit Pcnv_max, and then advances to the processing of Step S4 in FIG. 4. In other words, the management ECU 71, in the case the first SOC being less than the lamp lighting threshold, and the first output upper limit P1_lim being no more than the output threshold Pe0, sets the converter passing power upper limit Pcnv_max as a value larger than 0, and permits discharge of the second battery B2 so as to be able to secure the output threshold Pe0, by combining the output powers of the first battery B1 and second battery B2. In other words, the management ECU 71, in the case of the first SOC being less than the lamp lighting threshold, and the first output upper limit P1_lim being no more than the output threshold Pe0, sets the converter passing power upper limit Pcnv_max to a larger value than a case of the first SOC being less than the lamp lighting threshold and the first output upper limit P1_lim being larger than the output threshold Pe0, and thus permits discharge of the second battery B2.

Figure 7:
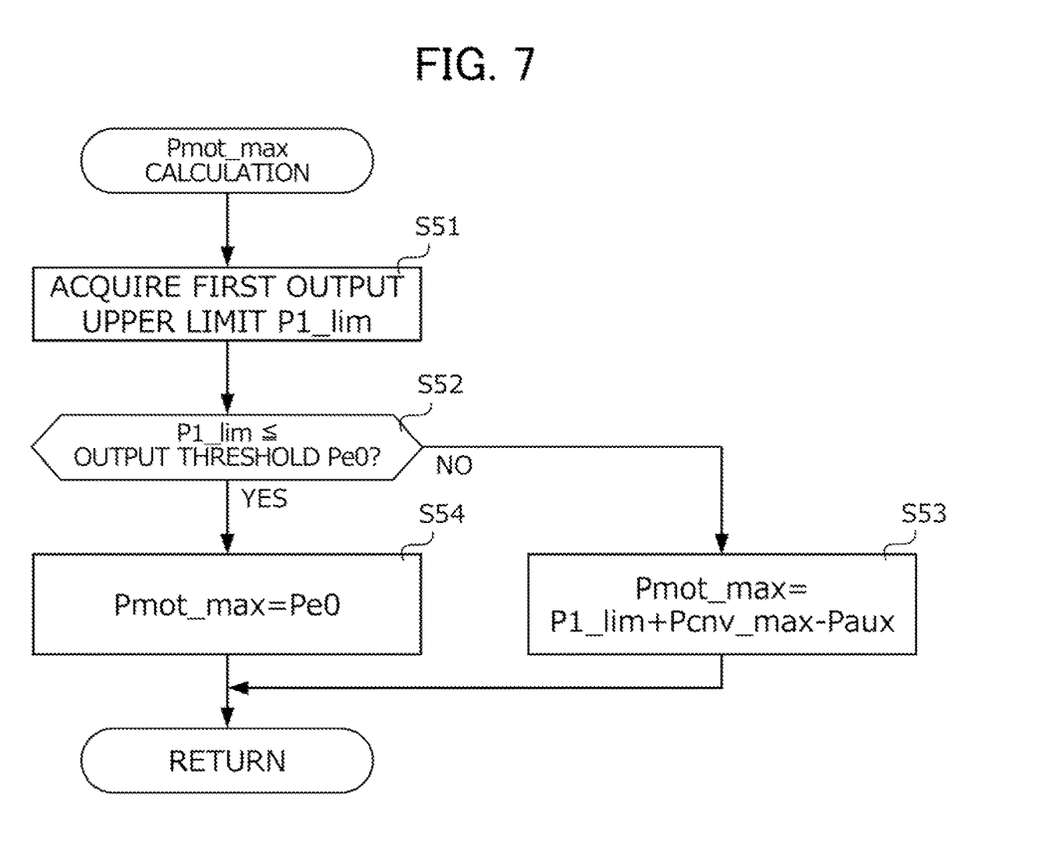
FIG. 7 is a flowchart showing a sequence of calculating an inverter passing power upper limit.

FIG. 7 is a flowchart showing a sequence of calculating the inverter passing power upper limit Pmot_max.

First, in Step S51, the management ECU 71 acquires the first output upper limit P1_lim, and then advances to Step S52. In Step S52, the management ECU 71 determines whether the first output upper limit P1_lim is no more than the output threshold Pe0.

The management ECU 71 advances to Step S53 in the case of the determination result in Step 352 being NO, i.e. case of the first output upper limit P1_lim being greater than the output threshold Pe0, calculates the inverter passing power upper limit Pmot_maz by subtracting the requested auxiliary power Paux acquired in Step S1 in FIG. 3, from the sum of the first output upper limit P1_lim acquired in Step S51 and the converter passing power upper limit Pcnv_max calculated by the processing in FIG. 4 (Pmot_max=P1_lim+Pcnv_max−Paux), and then advances to the processing of Step S5 in FIG. 4.

The management ECU 71 advances to Step S54 in the case of the determination result in Step S52 being YES, i.e. case of the first output upper limit P1_lim being no more than the output threshold Pe0. In Step 354, the management ECU 71 sets the output threshold Pe0 as the inverter passing power upper limit Pmot_max (Pmot_max=Pe0), and then advances to the processing of Step S5 in FIG. 4.

Figure 8:
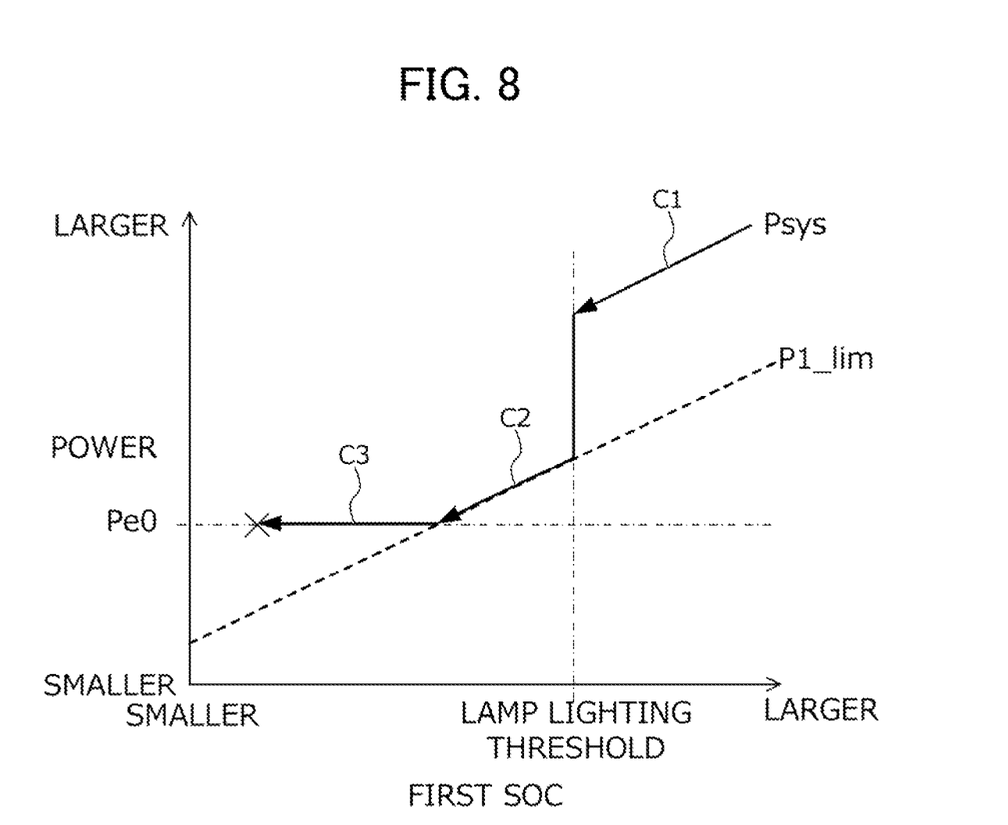
FIG. 8 is a graph showing changes in a first output upper limit and system output when the first SOC declines to near a lamp lighting threshold.

FIG. 8 is a view showing changes in the first output upper limit P1_lim (dashed line) and system output Psys (solid line) when the first SOC declines to near the lamp lighting threshold. Herein, system output Psys is the sum of the power outputted from the first battery B1 and the power outputted from the second battery B2. It should be noted that, in order to facilitate understanding, the example of FIG. 8 shows a case of the requested auxiliary power Paux being set as 0, and the requested inverter passing power Pmot_d always being set to the maximum.

In the case of the first SOC being greater than the lamp lighting threshold, the first output upper limit P1_lim also declines with a decline in the first SOC by the power being taken out from the first battery B1 and second battery B2. For this reason, the system output Psys follows the path C1 with a decline in the first output upper limit P1_lim, and gradually declines.

Herein, in the case of the second voltage parameter OCV2 corresponding to the static voltage of the second battery B2 being greater than the first voltage parameter CCV1 corresponding to the closed circuit voltage of the first battery B1, in the time until the first SOC becomes no more than the lamp lighting threshold, the management ECU 71 sets the second output upper limit P2_lim as the converter passing power upper limit Pcnv_max (refer to Step S29 in FIG. 5), and executes active discharge control causing the power of the second battery B2 to discharge until the second voltage parameter OCV2 becomes no more than the first voltage parameter CCV1 (refer to Step S8 in FIG. 4, and Steps S23, S24, S25 and S28 in FIG. 5). At the moment when the first SOC declines to no more than the lamp lighting threshold, it is thereby possible to set the second voltage parameter OCV2 to less than the first voltage parameter CCV1.

After executing such active discharge control, the management ECU 71 starts range extending control in response to the first SOC becoming no more than the lamp lighting threshold (refer to Step S32 in FIG. 5). In addition, in this range extending control, the management ECU 71 sets the converter passing power upper limit Pnv_max as 0 (refer to Steps S41 and S42 in FIG. 6) in the case of the first output upper limit P1_lim of the first battery B1 being greater than the output threshold Pe0, and thus inhibits discharge of the second battery B2. For this reason, the system output Psys follows the path C2, and declines to the first output upper limit P1_lim.

Subsequently, the management ECU 71, in response to the first output upper limit P1_lim of the first battery B1 declining to the output threshold Pe0, sets the first output upper limit P1_lim as the inverter passing power upper limit Pmot_max, and limits the power supplied from the first power circuit 2 to the drive motor M to no more than the first output upper limit P1_lim (refer to Steps S52 and S54 in FIG. 7). In addition, the management ECU 71, when the first output upper limit P1_lim declines to the output threshold Pe0, permits discharge of the second battery B2 so as to compensate for the deficient amount by the first battery B1 (refer to Steps S41, S43 and S44 in FIG. 6). For this reason, the system output Psys follows the path C3 on the output threshold Pe0. Subsequently, when the first output upper limit P1_lim declines, and the system output upper limit which is the sum of the first output upper limit P1_lim and second output upper limit P2_lim becomes less than the output threshold Pe0, the remaining travelable distance becomes 0. It is thereby possible to use up the power stored in the first battery B1 until the remaining travelable distance becomes 0. In addition, with the power supply system 1, by executing the active discharge control until the second voltage parameter OCV2 becomes no more than the first voltage parameter CCV1 prior to starting the range extending control accompanying inhibition of discharge of the second battery B2 in this way, it is possible to prevent the second battery B2 from turning to unintended discharge during execution of the range extending control, while inhibiting discharge of the second battery B2, and the remaining travelable distance from becoming 0 before using up the power stored in the first battery B1 as a result.

According to the power supply system 1 related to the present embodiment, the following effects are exerted.

(1) The power supply system 1 connects the first power circuit 2 having the first battery B1 and the second power circuit 3 having the second battery B2 which has a use voltage range for the closed circuit voltage that overlaps the first battery B1 and a static voltage lower than the first battery B1, by the voltage converter 5, and connects the first power circuit 2 and the drive motor M by the power converter 43. The electronic control unit group 7 controls the charge/discharge of the first battery B1 and second battery B2 by operating the power converter 43 and voltage converter 5. Herein, in the case of wanting to inhibit or suppress discharge from the second battery B2 for any reason, the electronic control unit group 7 operates the voltage converter 5 and/or power converter 43 so that all or a majority of the requested inverter passing power Pmot_d for the drive motor M is covered by the power outputted from the first battery B1. However, when electrical current flowing in the first battery B1 increases, there are cases where the closed circuit voltage of the first battery B1 becomes lower than the static voltage of the second battery B2, and unintended power is outputted from the second battery B2. To address this, the electronic control unit group 7 causes power to discharge from the second battery B2 so that the second voltage parameter OCV2 corresponding to the static voltage of the second battery B2 becomes no more than the first voltage parameter CCV1 corresponding to the closed circuit voltage of the first battery B1. Consequently, according to the power supply system 1, it is possible to prevent that second battery B2 from turning to unintended discharge by the static voltage of the second battery B2 falling below the closed circuit voltage of the first battery B1.

(2) The electronic control unit group 7, in the case of the first SOC being at least the lamp lighting threshold, executes active discharge control to cause power to discharge from the second battery B2 so that the second voltage parameter OCV2 becomes no more than the first voltage parameter CCV1, and in the case of the first SOC being less than the lamp lighting threshold, executes range extending control accompanying a limitation in discharge of the second battery B2. In the case of excessive power being stored in the second battery B2 while starting range extending control for using up the power stored in the first battery B1, it is thereby possible to actively decrease the second SOC of the second battery so that unintended power is not discharged from the second battery B2 during execution of the range extending control.

(3) In the power supply system 1, the management ECU 71 acquires the effective value for the closed circuit voltage of the first battery B1 as the first voltage parameter CCV1. The instantaneous value of the closed circuit voltage of the first battery B1 varies according to the load fluctuation including the drive motor M. To address this, with the power supply system 1, by setting the effective value for the closed circuit voltage of the first battery B1 as the first voltage parameter CCV1, it is possible to prevent degradation of the driving performance by excessively suppressing discharge from the second battery B2.

(4) In the power supply system 1, the management ECU 71 acquires, as the first voltage parameter CCV1, the closed circuit voltage of the first battery B1 when power corresponding to the output threshold Pe0 is being outputted from the first battery B1. According to the power supply system 1, by executing active discharge control until the second voltage parameter OCV2 becomes no more than the first voltage parameter CCV1 defined in this way, it is possible to more reliably prevent unintended power from being discharged from the second battery B2 during execution of range extending control.

Although an embodiment of the present invention has been explained above, the present invention is not limited thereto. The configurations of detailed parts may be modified as appropriate within the scope of the gist of the present invention.

What is claimed is:
1. A power supply system comprising:
a first power circuit having a first electrical storage device;
a second power circuit having a second electrical storage device having a use voltage range relative to a closed circuit voltage which overlaps the first electrical storage device and a static voltage which is lower than the first electrical storage device;

a voltage converter which converts voltage between the first power circuit and the second power circuit;

a power converter which converts power between the first power circuit and a rotary electrical machine;

a power control unit for controlling charge/discharge of the first electrical storage device and the second electrical storage device by operating the voltage converter and the power converter;

a first voltage parameter acquisition unit for acquiring a first voltage parameter corresponding to a closed circuit voltage of the first electrical storage device; and a second voltage parameter acquisition unit for acquiring a second voltage parameter corresponding to a static voltage of the second electrical storage device, wherein the power control unit causes power to be discharged from the second electrical storage device so that the second voltage parameter becomes no more than the first voltage parameter.

2. The power supply system according to claim 1, further comprising:

a first remaining amount parameter acquisition unit for acquiring a first remaining amount parameter which varies according to a remaining amount of the first electrical storage device; and a first output upper limit acquisition unit for acquiring a first output upper limit, which is an output upper limit of the first electrical storage device, wherein the second electrical storage device has higher output density and lower energy density than the first electrical storage device, and wherein the power control unit in a case of the first remaining amount parameter being at least a remaining amount threshold, causes power to be discharged from the second electrical storage device so that the second voltage parameter becomes no more than the first voltage parameter, and in a case of the first remaining amount parameter being less than the remaining amount threshold and the first output upper limit being greater than an output threshold, limits discharge of the second electrical storage device more than a case of the first remaining amount parameter being at least the remaining amount threshold.

3. The power supply system according to claim 2, wherein the first voltage parameter acquisition unit acquires an effective value of closed circuit voltage of the first electrical storage device, as the first voltage parameter.

4. The power supply system according to claim 2, wherein the first voltage parameter acquisition unit acquires the closed circuit voltage of the first electrical storage device when power corresponding to the output threshold is being outputted from the first electrical storage device, as the first voltage parameter.

* * * * *